No. 778,159. PATENTED DEC. 20, 1904.
F. WALTER.
AUTOMOBILE SLED.
APPLICATION FILED JUNE 8, 1904.
NO MODEL.
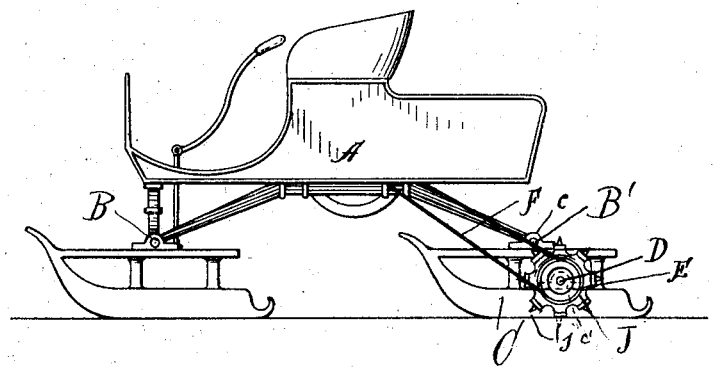
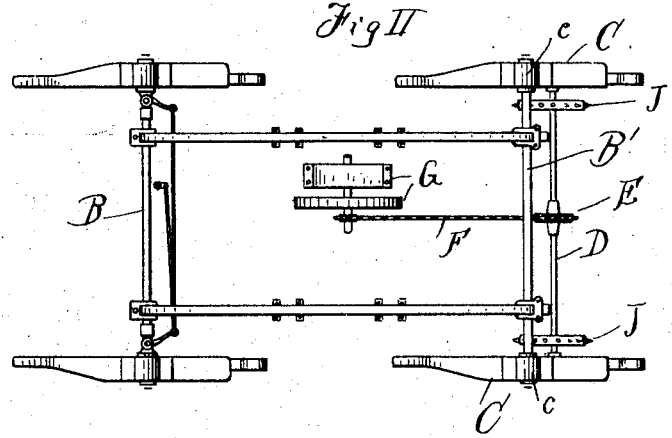
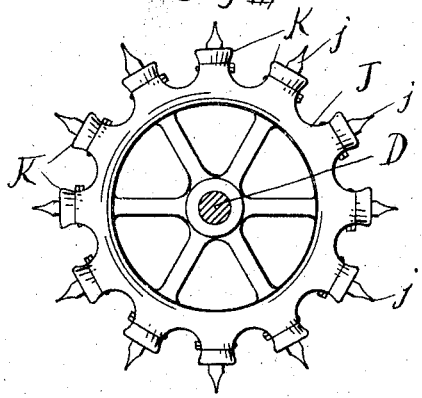
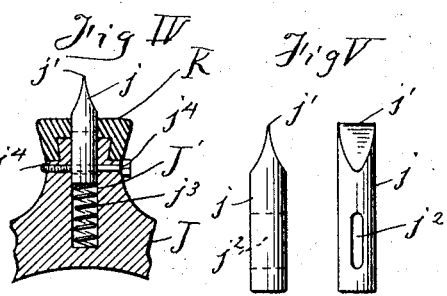
Witnesses:
A. L. Lord
E. B. Donnelly
Inventor:
Frank Walter
by W. E. Donnell
his Attorney No. 778,159. Patented December 20, 1904.

UNITED STATES PATENT OFFICE.

FRANK WALTER, OF CLEVELAND, OHIO.

AUTOMOBILE SLED.

SPECIFICATION forming part of Letters Patent No. 778,159, dated December 20, 1904.

Application filed June 8, 1904. Serial No. 211,663.

*To all whom it may concern:*

Be it known that I, FRANK WALTER, a citizen of the United States, residing at Cleveland, in the county of Cuyahoga and State of Ohio, have invented certain new and useful Improvements in Automobile Sleds; and I do hereby declare the following to be a full, clear, and exact description of the invention, such as will enable others skilled in the art to which it pertains to make and use the same.

My invention relates to automobiles, and has for its object the adapting of the automobile to the use of wheels, as is usual in vehicles of this type, and also to the employment of sleigh-runners when wheels are either useless or not desired.

My invention consists in the construction of runners adapted to be secured to the axles of an automobile and the employment in connection therewith of propelling means secured in an operative manner to the rear runners, the propelling means being adapted for connection with the motor on the vehicle-body.

My invention further consists in constructive features and assemblage of parts coöperating with each other for the purpose of adapting the vehicle to be used with sleigh-runners, as will be hereinafter fully set forth, and be particularly pointed out in the claims.

In the drawings, Figure I is a longitudinal vertical section in side elevation, illustrating an automobile-body and its running-gear with the exception of the wheels, showing the same with sleigh-runners attached. Fig. II is a plan view of the running-gear, including the steering mechanism and motor mechanism, of an automobile with sleigh-runners attached. Fig. III is a view in elevation of a driving-wheel or propelling-wheel with spurs attached, illustrating more clearly the construction thereof. Fig. IV is a sectional view illustrating the details employed for the attachment of the spurs to the wheel and the cushioning of the wheel. Fig. V is a view in elevation, illustrating the construction of the spurs employed.

A represents the body of a motor-vehicle mounted on the running-gear, with the usual spring connection and in any suitable manner. This body A has the usual appurtenances of an automobile-body, including the starting-levers, steering-levers, motor, &c. These details or appurtenances may be of any of the usual type employed in motor-vehicles.

B B' represent the forward and rear axles, respectively, the forward axle B being constructed with the usual steering-knuckles, just as they are employed where wheels are secured, and B', the rear axle, is also the same as that employed for wheels. In other words, the automobile structure, including the body and running-gear, including the axles, is the same in all respects as it would be where wheels are employed as the traction and running medium.

C represents a pair of rear runners. These runners C are provided with bearings $c$, adapted to fit on the ends of the axle B' and to be fastened to the axle in any suitable manner so as to allow them to be interchangeable with wheels. The runners C are also provided to the rear of the journal $c$ and at a point beneath said journal $c$ with the journal $c'$, which form the bearing for the ends of the shaft D, upon which is mounted a sprocket-wheel E, this sprocket-wheel E being adapted for the employment or connection with a sprocket-chain F, which may be the sprocket-chain employed with the usual traction mechanism of the automobile when mounted on wheels or may be another one especially adapted for this purpose, the object being the revolving of the shaft D by the motor mechanism G, which is the usual motor mechanism of the automobile. Mounted also on the shaft D are two traction-wheels or driving-wheels J J. These wheels J J are located just inside of the runners C and in close proximity to said runners and are each provided with a series of spurs $j$, projecting beyond the periphery of said wheel and mounted in said wheel, as illustrated in Fig. IV—viz., each spur is constructed as illustrated in Fig. V, with the chisel-points $j'$ and a slot $j^2$. The periphery of the wheels J are formed with a series of openings J', into which fit the spurs $j$. The spurs rest upon springs $j^3$, which tend to project them, and are held in place by means of pins $j^4$, which pass through the slots $j^2$ in the spurs. The slots $j^2$ allow the spurs to be pushed inward if they should strike a hard obstruction, and the springs $j^3$ keep the spurs out, so that they will engage the surface over which the runners pass. In order to cushion the wheels J at their peripheral portion, they are provided with cushions K, constructed either as illustrated in Figs. II and IV, where they are made in the form of caps, protecting the outer ends of the radial arms of the wheels, which receive the spurs $j$, or they may be made in the form of a continuous band where it is desired to make the periphery of the wheel continuous. The spurs $j$ project through the cushions K and are adapted to recede beyond the outer surface of the same.

The operation of the vehicle can be easily understood, as the power is applied so as to revolve the wheels J J, and the vehicle is steered through the two forward runners as though they were ordinary wheels.

It will be noticed that the wheels J J are so mounted in relation to the runners that the spurs $j$ project below the running portion of said runners, so as to project into the snow or surface upon which the runners are adapted to slide and that should said wheel strike a projection the spurs $j$ will recede and the cushions K receive the shock.

What I claim is—

1. An automobile comprising a body portion, a motor supported thereby, a running-gear comprising a forward steering-axle and a rear axle, runners mounted on the ends of said axles, a shaft journaled in said rear runners, means for rotating said shaft from the motor, and spurred wheels fixed to said shaft, substantially as described.

2. In an automobile of the type set forth comprising sled-runners, a spurred propelling-wheel provided with spring pressed or operated spurs mounted within the periphery thereof, and said wheels having cushioned peripheries through which said spurs pass, substantially as set forth.

Signed at Cleveland, in the county of Cuyahoga and State of Ohio, this 25th day of May, 1904.

FRANK WALTER.

Witnesses:
E. B. DONNELLY,
W. E. DONNELLY.